June 17, 1952 — J. W. WHEELER — 2,600,715

HYDRAULIC BRAKE ACTUATOR FOR HELICOPTER ROTORS

Filed Jan. 3, 1950

INVENTOR
John W. Wheeler
BY
Bean, Brooks, Buckley & Bean.
ATTORNEYS

Patented June 17, 1952

2,600,715

UNITED STATES PATENT OFFICE 2,600,715

HYDRAULIC BRAKE ACTUATOR FOR HELICOPTER ROTORS

John W. Wheeler, Grand Island, N. Y., assignor to Bell Aircraft Corporation, Wheatfield, N. Y.

Application January 3, 1950, Serial No. 136,445

6 Claims. (Cl. 60—54.5)

This invention relates to helicopter aircraft, and more particularly to an improved hydraulic brake device for helicopter rotors and the like wherein the brake actuator mechanism is necessarily at a higher elevation than the control piston-cylinder mechanism.

Whereas, it is presently known to be desirable to provide in helicopter type aircraft some suitable brake device for halting "coasting" rotation of the helicopter rotor subsequent to landing of the aircraft and disengagement of the rotor-engine clutch; it has been noted that such brake devices must be constructed so as to obtain uniform braking effects under various conditions of operation in order to avoid unpredictable reactions upon the grounded aircraft. Furthermore, it has been noted that prior type hydraulic brake systems for the purposes referred to herein are productive of highly variable braking effects because of the tendencies to develop cavitation in the hydraulic line when the brake actuator piston-cylinder is at an elevation above the control piston-cylinder; and also as a result of changing ambient atmospheric pressure conditions, as when operating the aircraft on landing fields at different elevations above sea level.

Also, it has been noted that temperature changes result in expansion-contraction of the oil in the hydraulic system and require that the oil level in the reservoir change correspondingly; and therefore it is one of the objects of the present invention to provide an improved rotor braking system for helicopter aircraft and the like of the manually controlled hydraulic actuated type which will provide uniform braking effects under varying conditions as aforesaid.

Another object of the invention is to provide an improved braking system of the character aforesaid which automatically maintains a predetermined constant pressure differential in the braking system relative to the ambient atmosphere in spite of variations in the atmospheric pressure.

Another object of the invention is to provide an improved braking system of the character aforesaid which operates automatically to maintain the hydraulic line between the control piston and the brake actuator filled with hydraulic fluid and to prevent cavitation therein, whereby "pumping" of the control piston is unnecessary to condition the system for effective operation, and whereby uniformly short stroke operation of the control piston will provide effective brake actuation.

Another object of the invention is to provide an improved braking system embodying the features aforesaid and which is of relatively simple and inexpensive yet rugged construction.

Other objects and advantages of the invention will appear from the specification hereinafter.

Figure 1:
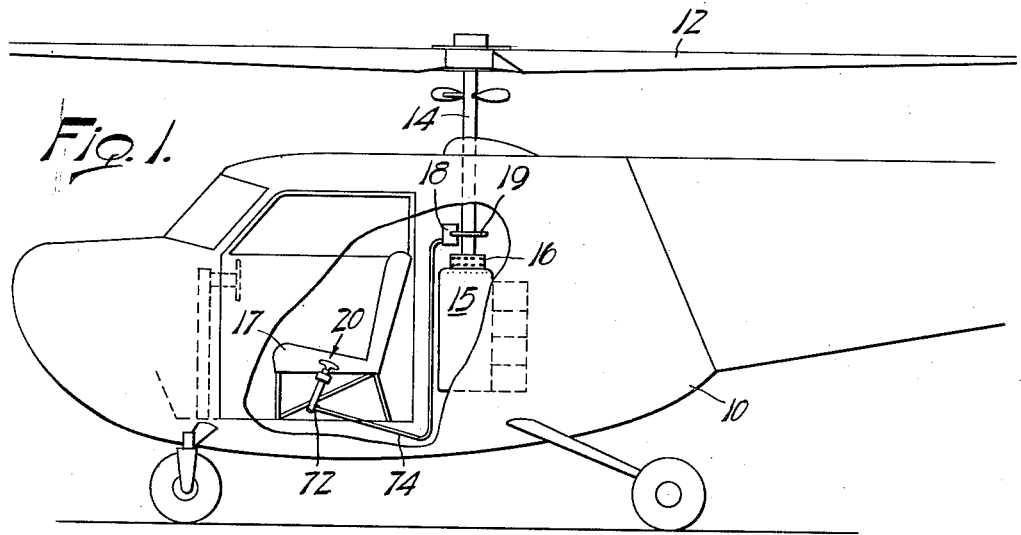
Fig. 1 is a fragmentary side elevation of a helicopter aircraft embodying a rotor brake system of the invention.

As shown in Fig. 1, the invention is illustrated as being incorporated in a helicopter aircraft comprising generally a body 10 mounting a lift rotor 12 which is driven by a shaft 14 by means of an engine 15 through a clutch as indicated at 16. The pilot's seat is indicated at 17, and the rotor is arranged to be braked by means of a brake shoe device 18 which engages upon a friction disc 19 carried by the rotor shaft 14. The shoe device 18 may of course be of any suitable type, such as for example a double jaw mechanism which is adapted to be actuated by means of a hydraulic piston-cylinder or diaphragm device so as to alternately release and engage in frictional relation upon the disc 19 which rotates with the rotor.

Figure 2:
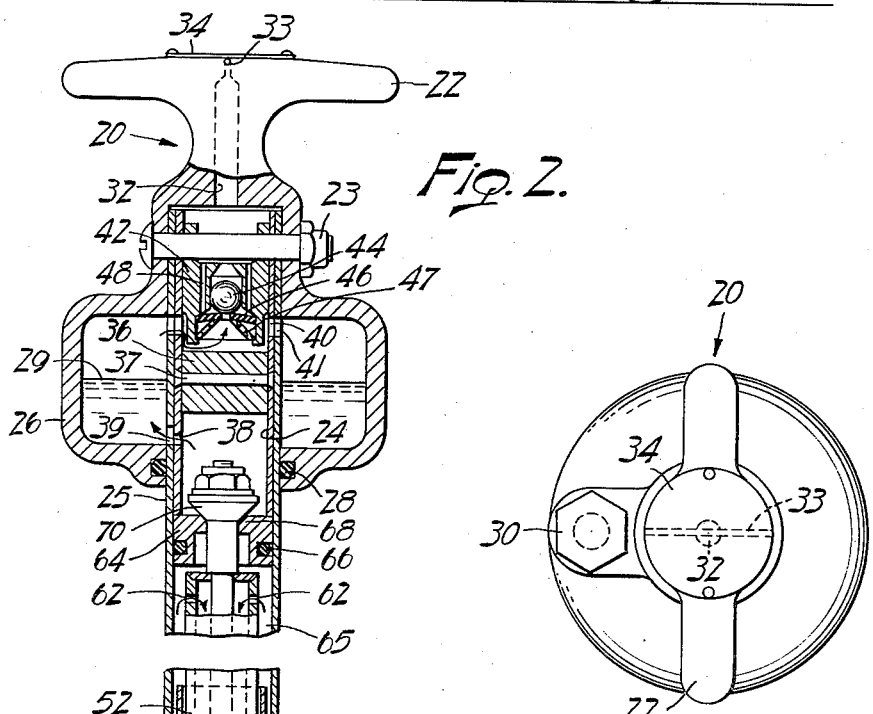
Fig. 2 is a fragmentary vertical section through the manual control portion of the hydraulic system.
Figure 3:
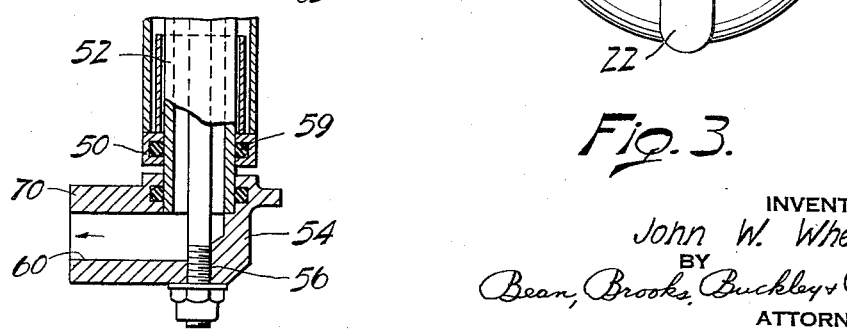
Fig. 3 is a top plan view of the structure of Fig. 2.

To control the brake shoe device 18 I provide a novel manual control mechanism which is mounted conveniently below the seat 17 as indicated generally at 20 and comprises a handle portion 22 which is arranged to be pulled upwardly to apply the brake mechanism. The handle portion 22 is centrally bored to receive in bolted relation therein as indicated at 23, a pair of concentric inner and outer tubes 24—25, respectively. The handle portion 22 is also formed with an enlarged annular chamber portion 26 which encircles the outer tube 25 and is arranged in fluid-sealed relation therewith by means of a packing 28. Thus, the casing portion 26 provides a hollow chamber which constitutes the fluid reservoir portion of the device for containing a supply of hydraulic fluid therein; the latter being maintained at a level within the reservoir such as is indicated at 29 (Fig. 2). A filler plug 30 (Fig. 3) is provided in a top portion of the reservoir casing 26 for convenient replenishment of the oil supply, as needed.

The upper end of the handle portion 22 is centrally bored as indicated at 32 in communication with the interior of the inner tube 24, and the bore 32 communicates at its upper end with a transverse groove 33 which is formed in the top surface of the handle member and is covered by a cover plate 34 so that even though the operator's hand may be firmly pressed downwardly upon the handle member 22, the air vent passageway provided by the bore 32 and the groove 33 will not be covered and thereby closed off. Thus, it will be understood that the upper end portion of the inner tube 24 is at all times in open communication with the ambient atmosphere.

At about the elevation of the fluid level 29 within the reservoir 26, the inner tube 24 is partitioned by means of a plug 36 which is riveted or otherwise fixed within the bore of the tube 24 as indicated at 37 and functions as a fluid splash baffle. Thus, the bore of the tube 24 is divided into upper and lower portions, and fluid ports 38—39 are formed through the walls of the tubes 24—25, respectively, in positional alignment so as to provide for free fluid transfer between the reservoir 26 and the lower chamber portion within the tube 24. Similarly, ports 40—41 formed through the walls of the tubes 24—25 above the position of the plug 36 intercommunicate the air space within the reservoir 26 and the upper bore portion of the tube 24.

Above the elevation of the port 40 in the wall of the tube 24, I provide an automatic pressure regulator device comprising a plug 42 which is centrally bored to accommodate in free floating position therein a steel ball 44 which is arranged to rest upon a centrally bored rubber disc 46 which is in turn supported by a perforated metal cone 47 which is snap-fitted into the lower flanged end portion of the plug 42. Air passageways 48 are provided through the body of the plug 42 above the position of the valve disc 46 so that the air chamber portion within the casing 26 is in communication with the atmosphere externally of the device by means of the channel 33, the bore 32, the passageways 48, and the ports 40—41, as controlled by operation of the valve ball 44 relative to the opening through the valve disc 46.

At its lower end the outer tube 25 terminates in a ring portion 50 which slide-fits upon a cylinder 52 which is fixed to extend upwardly from a base member 54. A valve rod 56 is also fixed to extend upwardly from the base 54 through the cylinder 52. The slide ring 50 is fluid-sealed relative to the cylinder 52 as by means of an O-ring seal 59. The base bracket 54 is bored as indicated at 60 in communication with the interior of the cylinder 52, and the cylinder wall is ported as indicated at 62. A floating valve ring 64 is disposed within the outer tube 25 to abut the lower end of the tube 24 and to slidably float within the tube 25 between the lower end of the tube 24 and the top end of the cylinder 52, as will be explained more fully hereinafter. Thus, a fluid space 65 is provided between the tube 25 and the cylinder 52. An O-ring device as indicated at 66 is arranged to fluid-seal the ring 64 relative to the tube 25, and the ring 64 is formed with a conical valve seat portion 68 which is arranged to engage a frusto-conical valve member 70 which is carried at the top end of the rod 56.

The base bracket 54 extends as indicated at 72 into connection with a conduit 74 (Fig. 1) which leads to the brake shoe mechanism 18. The brake shoe actuator, the conduit 74, and the brake actuating handle device are all filled with hydraulic fluid, except that the handle device 20 is filled with fluid only up to the level such as is indicated at 29 (Fig. 2); the ball 44 being preselected to be of such weight as to seat upon the valve disc 46 to maintain a pressure head against the hydraulic fluid column in the conduit 74 which will maintain the hydraulic fluid to fill the conduit 74 and the brake shoe actuator mechanism once the system is primed. Upon manual pulling of the handle 22 upwardly the reservoir and the outer tube 25 will be thereby displaced upwardly relative to the cylinder 52 while the valve rod 56 maintains the valve ring 64 at the elevation thereof shown in Fig. 2. Consequently, such upward displacement of the outer tube 25 will cause the distance between the lower ring 50 and the floating ring 64 to shorten, whereby the fluid within the space 65 will be forced through the ports 62 and thence downwardly through the interior of the cylinder 52 and through the bore 60 into the conduit 74 in such manner as to thereby apply increased pressure through the conduit against the brake shoe actuator mechanism, thereby causing the brake to be applied to the rotor disc 19. Then, upon release of the handle 22, the latter will simply settle down again to its normal inoperative position; the fluid previously forced up into the brake actuator now finding return through the conduit into the enlarging space 65 within the control handle device.

Inasmuch as the ring 64 is free to float within the tube 25 between positions of abutment against the bottom end of the tube 24 and the upper end of the cylinder 52, it will be appreciated that whenever the device is in condition of repose the valve surfaces 68—70 will be relatively free to permit settling of fluid from the reservoir through the ports 38—39 and into the cylinder space 65; thereby at all times maintaining the operative system in full supply of fluid. Also, it will be appreciated that, as stated hereinabove, the preselected weight of the valve ball 44 and the size of the central hole in the disc 46 will determine the pressure head which will apply against the air within the chamber 26 above the fluid level therein; and consequently, the pressure head through the hydraulic system against the brake shoe actuator. Also, it will be appreciated that this automatic valve ball device will automatically adapt the unit to changing atmospheric pressure conditions externally thereof because whenever the air pressure within the reservoir 26 exceeds the atmospheric pressure externally of the device the ball 44 will function as a check valve to cause adjustment of the system pressure so as to maintain the desired pressure differential, whereby the ball 44 continues to control the pressure head against the hydraulic system; and whenever the internal reservoir pressure falls below the ambient atmospheric pressure due to pulling up upon the handle 22 the valve seat device 46 operates to permit entry of air into the reservoir.

Hence, the system of the invention is at all times maintained in fluid-charged and optimum condition for operation under constant pressure head effects in spite of temperature or ambient pressure variations, whereby the aircraft operator may without undue attention to the device employ the brake control mechanism to obtain uniformly predictable braking effects upon the "coasting" rotor. It will of course be appreciated that although only one form of the invention has been shown and described in detail it will be apparent to those skilled in the art that the invention is not so limited but that various changes may be made therein without departing from the spirit of the invention or the scope of the appended claims.

I claim:

1. In combination, a hydraulic pressure responsive actuator, a hydraulic control device comprising relatively displaceable piston-cylinder means arranged in telescopic relation and defining therebetween a fluid chamber, a closed conduit interconnecting said chamber and said hydraulic pressure responsive actuator, a fluid reservoir adjacent said chamber and arranged for communication with the latter, a check valve controlling communication between said reservoir and said chamber, and means maintaining fluid under air pressure at a preselected head within said reservoir, said means comprising a weighted ball member seated upon a perforated valve disc and disposed within an air vent conduit from said reservoir to the atmosphere externally thereof, whereby said weighted ball member controls the flow of air into and out of said reservoir and thereby determines the pressure head against said hydraulic system.

2. In combination hydraulic pressure responsive actuator means, a control device comprising relatively displaceable piston-cylinder means arranged in telescopic relation and defining therebetween a fluid chamber disposed at a lower elevation than said actuator means, a closed conduit interconnecting said chamber and said actuator means, a fluid reservoir adjacent said chamber and arranged in communication with the latter as controlled by a check valve device, and means maintaining fluid under air pressure at a preselected head within said reservoir, said means comprising a weight member seated upon a perforated valve disc and disposed within an air vent conduit from said reservoir to the atmosphere externally thereof, whereby said weight member controls the flow of air into and out of said reservoir and thereby determines the pressure head against said hydraulic system.

3. In combination, hydraulic pressure responsive actuating means, a control device comprising relatively displaceable piston-cylinder means defining therebetween a fluid chamber, a closed conduit interconnecting said chamber and said responsive actuating means, a fluid reservoir adjacent said chamber and arranged in communication with the latter as controlled by a check valve device, and means maintaining fluid under air pressure at a preselected head within said reservoir, said means comprising a weight member seated upon a perforated valve disc and disposed within an air vent conduit from said reservoir to the atmosphere externally thereof, whereby said weight member controls the flow of air into and out of said reservoir and thereby determines the pressure head against said hydraulic system.

4. In combination, a hydraulic pressure-responsive actuator, a hydraulic control device comprising relatively displaceable piston-cylinder means arranged in telescopic relation and defining therebetween a fluid chamber disposed at an elevation below the elevation of said actuator, a closed conduit interconnecting said chamber and said hydraulic pressure-responsive actuator, a fluid reservoir adjacent said chamber and arranged for communication with the latter, a check valve controlling communication between said reservoir and said chamber, and means maintaining fluid under air pressure at a pre-selected head within said reservoir, said means comprising a weighted ball member seated upon a perforated valve disc and disposed within an air vent conduit from said reservoir to the atmosphere externally thereof, whereby said weighted ball member controls the flow of air into and out of said reservoir and thereby determines the pressure head against said hydraulic system.

5. In combination, a hydraulic pressure responsive actuator, a control device comprising a hydraulic jack disposed at an elevation below said actuator and defining a fluid chamber, a closed conduit interconnecting said chamber and said actuator, a fluid reservoir adjacent said chamber and arranged in communication with the latter as controlled by a check valve device, and means maintaining fluid under air pressure at a pre-selected head within said reservoir, said means comprising a weighted ball member seated upon a perforated valve disc and disposed within an air vent conduit from said reservoir to the atmosphere externally therof, whereby said weighted ball member controls the flow of air into and out of said reservoir and thereby determines the pressure head against said hydraulic system.

6. In combination, a hydraulic pressure responsive actuating means, a control means comprising a hydraulic jack disposed at an elevation below said pressure responsive actuating means and defining a fluid chamber, a closed conduit interconnecting said chamber and said responsive actuating means, a fluid reservoir adjacent said chamber and arranged in communication with the latter as controlled by a check valve device, and means maintaining fluid under air pressure at a pre-selected head within said reservoir, said means comprising a weight member seated upon a perforated valve disc and disposed within an air vent conduit from said reservoir to the atmosphere externally thereof, whereby said weight member controls the flow of air into and out of said reservoir and thereby determines the pressure head against said hydraulic system.

JOHN W. WHEELER.

REFERENCES CITED

The following references are of record in the file of this patent:

UNITED STATES PATENTS

| Number | Name | Date |
| --- | --- | --- |
| 1,999,737 | Pecker | Apr. 30, 1935 |
| 2,115,174 | Majneri | Apr. 26, 1938 |
| 2,141,091 | Quick | Dec. 20, 1938 |
| 2,197,126 | Dick | Apr. 16, 1940 |
| 2,344,299 | Groves | Mar. 14, 1944 |

FOREIGN PATENTS

| Number | Country | Date |
| --- | --- | --- |
| 549,333 | Great Britain | Nov. 17, 1942 |